Sept. 18, 1928.
J. C. SCHAF, JR
1,684,600
UNIVERSAL HOLDING CARRIAGE FOR TEST STANDS AND LATHES
Filed April 22, 1927     2 Sheets-Sheet 1
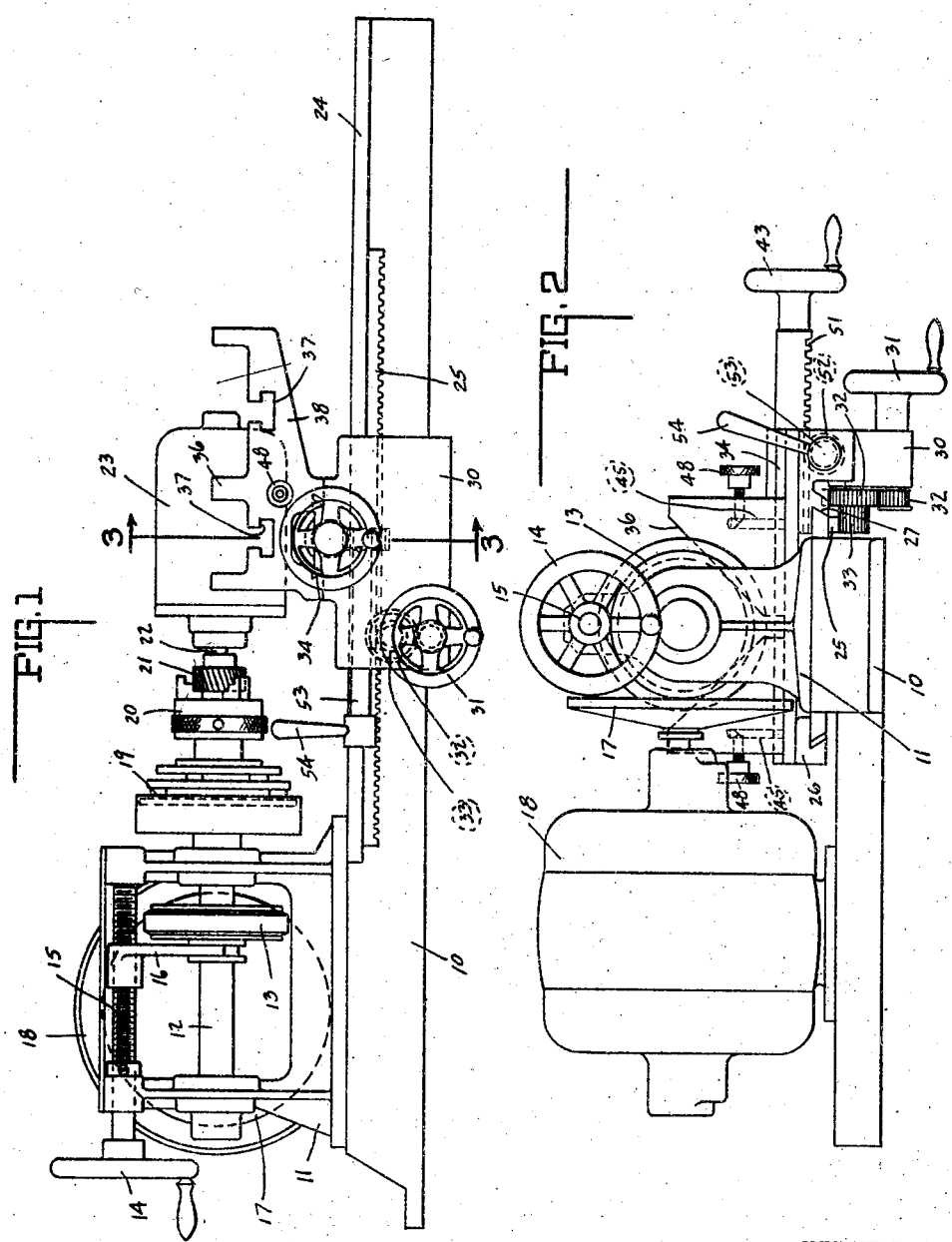
INVENTOR.
JOSEPH C. SCHAF, JR.
BY
ATTORNEYS.

Sept. 18, 1928.
J. C. SCHAF, JR
1,684,600
UNIVERSAL HOLDING CARRIAGE FOR TEST STANDS AND LATHES
Filed April 22, 1927    2 Sheets-Sheet 2
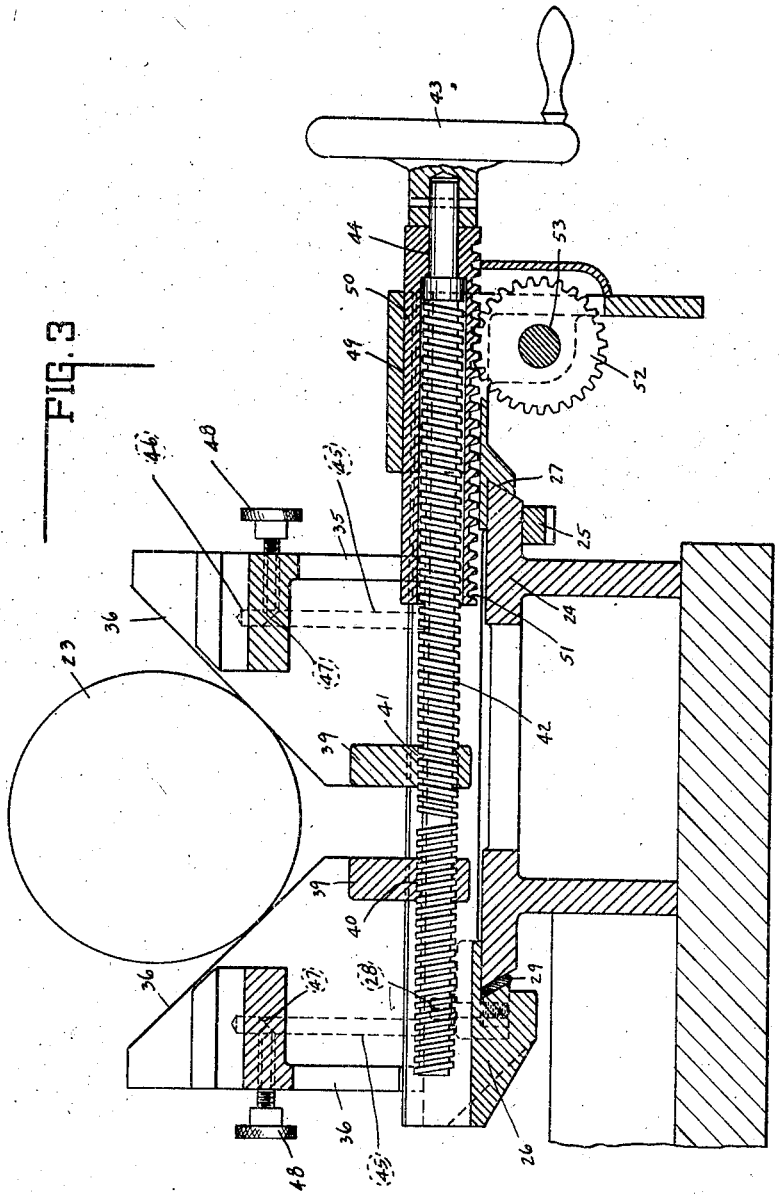
INVENTOR.
JOSEPH C. SCHAF, JR.
BY
ATTORNEYS.

Patented Sept. 18, 1928.

1,684,600

UNITED STATES PATENT OFFICE.

JOSEPH C. SCHAF, JR., OF INDIANAPOLIS, INDIANA.

UNIVERSAL HOLDING CARRIAGE FOR TEST STANDS AND LATHES.

Application filed April 22, 1927. Serial No. 185,679.

This invention relates to an adjustable clamping or universal holding device which is particularly adapted for use on test stands, lathes and the like, for securing and clamping an object in adjusted position for applying work thereto, reference being had to Letters Patent No. 1,523,723, issued January 20, 1925, for a "universal holding carriage for test stands and lathes."

The chief object of this invention is to secure relatively quick adjustment and to lock the parts in adjusted position.

The principal feature involved herein, consists in the extension of the gripping blocks longitudinally, whereby relatively elongated objects may be more conveniently handled and accurately positioned for the purpose above set forth, as well as mechanical improvements in the construction and action of the mechanism, as will be hereinafter more specifically set forth and described.

The full nature of the invention will be understood from the accompanying drawings and the following description and claims:

In the drawings Fig. 1 is a side elevation of the testing machine including the invention. Fig. 2 is an end elevation thereof. Fig. 3 is a vertical sectional view taken on line 3—3 of Fig. 1.

In the drawings 10 indicates a bed of a lathe or testing stand, 11 a headstock supporting a spindle 12 keyed and slidably mounted upon which is a friction driving wheel 13 adjustably positioned by means of the hand wheel 14, screw 15 and arm 16 in the desired driving engagement with a friction clutch plate 17 connected to a dynamo 18 or otherwise operated. Spindle 12 mounts the flexible driving connection 19 terminating in a chuck 20 for gripping or otherwise receiving in driving relationship a member 21 on the shaft 22 of the dynamo 23 to be tested. The bed 10 includes the dove-tail formed table slide 24 and a depending rack 25. All of the foregoing is shown in the before-mentioned patent and forms no part of the present invention.

A carriage 26 includes a dove-tail recess 27 and is slidable on the dove-tail table slide 24. Locking screw 28, through the gib 29, provides for the locking of the carriage 26 in the adjusted position on the table. The carriage includes a depending apron 30 and rotatably supported thereby is a hand-wheel 31 carrying a gear 32 meshing with a gear 32' mounted on a shaft which carries a pinion 33 which meshes with rack 25. The rotation of hand-wheel 31 when the locking member 28 is released permits the carriage to be moved longitudinally of the driving spindle 12 and the carriage is locked against shifting from the adjusting position by the locking means associated with the screw bolt 28. All of the aforesaid is shown in the before-mentioned patent.

The carriage, see Fig. 1, includes a transverse arranged way 34 which is dove-tailed in cross section and slidably supports a pair of similar but complementary blocks 35 and 36. Each block includes a plurality of spaced angularly inclined and parallel arranged bearing surfaces arranged substantially in the same plane and indicated by the numeral 36. Said blocks are provided with a plurality of parallel arranged T-slots 37 and in the present invention, see Fig. 1, said blocks are extended as at 38 to include an additional T-slot and an additional 45 degrees supporting surface 36. By the aforesaid arrangement three bearing surfaces are provided and these are sufficient to accommodate an elongated object and maintain the same in the desired alignment.

In common with the disclosure of the before-mentioned patent, each block includes a depending projection 39, one being provided with a right hand thread and the other being provided with a left hand thread, the latter being indicated by the numeral 40 and the former by the numeral 41. A screw shaft 42 has an oppositely threaded surface, the left hand thread portion being positionable in the left hand threaded recess 40 of projection 39, and the right hand portion being receivable by the threaded opening 42 of the other projection 39. The extended end of the screw shaft 42 carries a hand-wheel 43. The resultant construction is rotatably mounted in the bearing 44 and arranged to prevent longitudinal axial movement therebetween. Rotation of the hand-wheel 43 causes rotation of the screw shaft 42 and serves to cause relative movement between the projection 39 and therefore the blocks 35. Movement of the blocks towards each other causes the article (and its axis) supported thereby, such as the dynamo 23, to be elevated; separating movement of said blocks lowers the article and axis.

Each block 35 slidably supports a locking plunger 45 slidably mounted in a recess 46. Plunger 45 bears upon the way 34 and at its opposite end includes a cam face 47 engageable by the end of a thumb wheel screw bolt 48. When the wheel 48 is turned into engagement with the cam face 47 plunger 45 locks the respective sliding block against movement upon the dove-tailed way 34. When both thumb wheels are locked there can be no movement of the jaws relatively of each other. When either thumb wheel is locked the respective supporting block is locked against relative movement with respect to the carriage and the other block travels twice as fast towards or away from the stationary block for the same amount of rotation of the screw shaft. When both blocks are unlocked the relative movement between the blocks, that is, towards or away from each other, is equal from the median plane coincidental with the junction of the two reverse threads on the screw shaft 42.

Sleeve 50 is provided upon at least one portion of its periphery with rack teeth 51 and meshing therewith is a gear 52 carried upon a shaft 53 mounted in the apron and transverse to the screw shaft 42. Shaft 53 is extended and terminates in a handle 54. Oscillation of handle 54 causes oscillation of the pinion 52 and secures reciprocation of the sleeve 50 in the bearing 49 and since screw shaft 42 is locked through the bearing 44 to said sleeve, the blocks 35 and 36 are simultaneously reciprocated by the oscillation of the handle. Locking of either of the wheels 48 prevents reciprocation of the sleeve 50, but locking of either wheel 48 will not lock the blocks against relative movement towards and away from each other and in said movement when either of said blocks is locked and the other is free, the handle rotates upon rotation of the hand-wheel 43.

While the invention has herein been described as relating more particularly to a test stand for motors and generators, it may be employed with the same advantages with respect to a lathe or similar machine, tool or vise, wherein it may be desirable to clamp or adjust the object for varying purposes.

The invention claimed is:

1. The combination with a frame, a pair of slidably supported complementary blocks, of a reversely threaded screw for moving said blocks as a unit or relative to each other, each block having a threaded portion for engaging said screw, and a locking connection interposed between each block and frame for securing such relative movement.

2. The combination with a frame and a pair of slidably supported complementary blocks, of a reversely threaded screw for moving said blocks as a unit or relative to each other, each block having a threaded portion for engaging said screw, a bearing for said screw rotatably supporting the same but preventing longitudinal axial movement therebetween, and means for moving said bearing and screw longitudinally of the axis.

3. The combination with a frame and a pair of slidably supported complementary blocks, of a reversely threaded screw for moving said blocks as a unit or relative to each other, each block having a threaded portion for engaging said screw, a bearing for said screw rotatably supporting the same but preventing longitudinal axial movement therebetween, and means for moving said bearing and screw longitudinally of the axis comprising a rack rigid with the bearing and a pinion meshing with the rack.

4. The combination with a frame and a pair of slidably supported complementary blocks, of a reversely threaded screw for moving said blocks as a unit or relative to each other, each block having a threaded portion for engaging said screw, a bearing for said screw rotatably supporting the same but preventing longitudinal axial movement therebetween, means for moving said bearing and screw longitudinally of the axis, and a locking connection interposed between each block and frame.

5. The combination with a frame and a pair of slidably supported complementary blocks, of a reversely threaded screw for moving said blocks as a unit or relative to each other, each block having a threaded portion for engaging said screw, a bearing for said screw rotatably supporting the same but preventing longitudinal axial movement therebetween, means for moving said bearing and screw longitudinally of the axis comprising a rack rigid with the bearing and a pinion meshing with the rack, and a locking connection interposed between each block and frame.

In witness whereof, I have hereunto affixed my signature.

JOSEPH C. SCHAF, Jr.